Sept. 8, 1959                R. P. HEUER                2,903,254
REFRACTORY LINING FOR ROTARY KILNS
Filed Feb. 16, 1956                              4 Sheets-Sheet 1
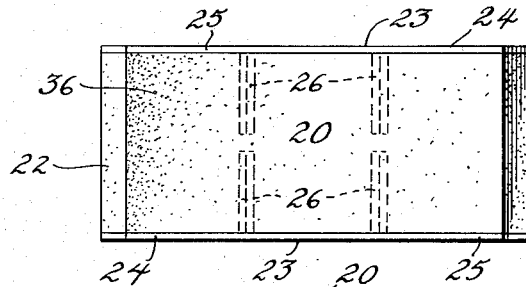
Fig. 1.
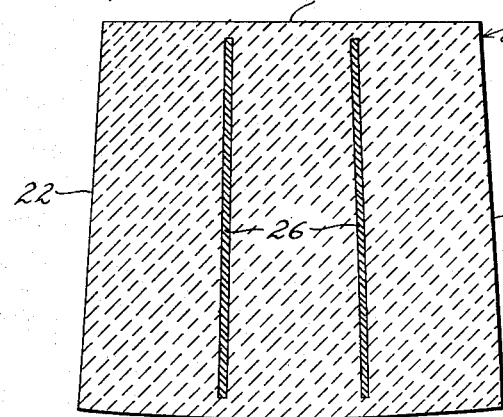
Fig. 3.
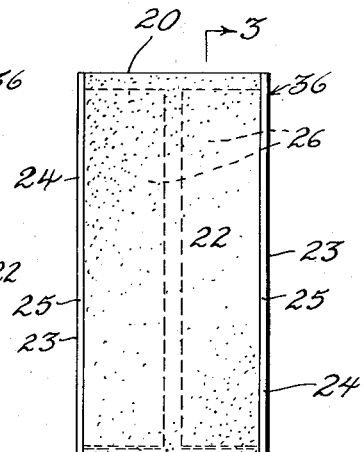
Fig. 2.
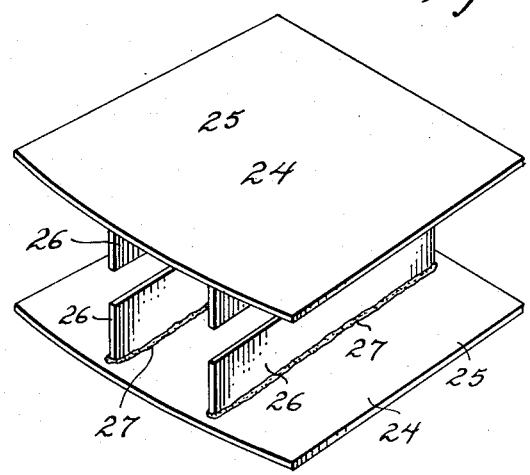
Fig. 4.
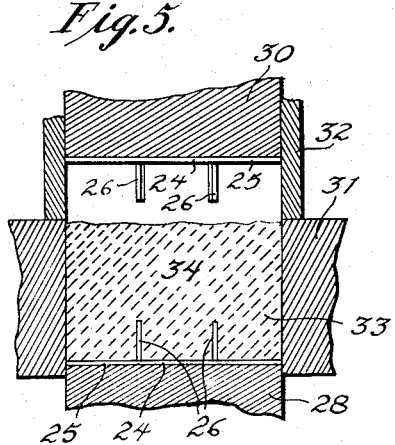
Fig. 5.
INVENTOR
RUSSELL PEARCE HEUER
BY
ATTORNEYS Sept. 8, 1959  R. P. HEUER  2,903,254
REFRACTORY LINING FOR ROTARY KILNS
Filed Feb. 16, 1956  4 Sheets-Sheet 2

INVENTOR
RUSSELL PEARCE HEUER
BY
ATTORNEYS

Sept. 8, 1959  R. P. HEUER  2,903,254
REFRACTORY LINING FOR ROTARY KILNS
Filed Feb. 16, 1956  4 Sheets-Sheet 3
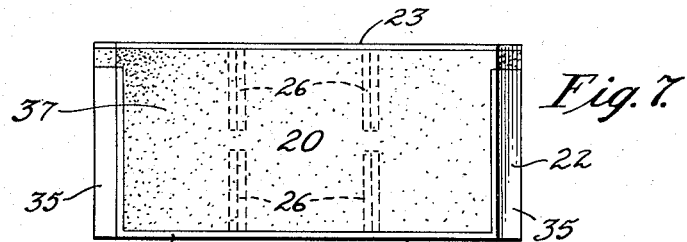
Fig. 7.
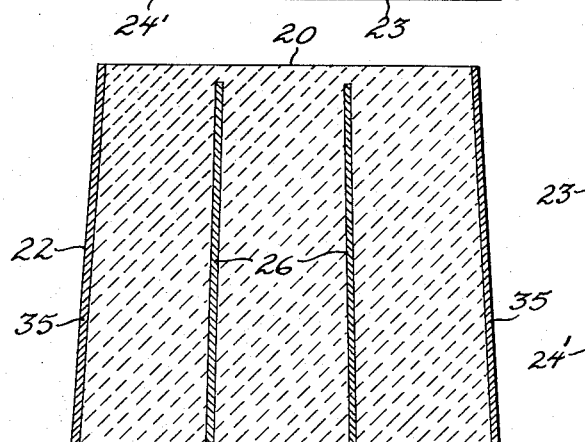
Fig. 9.
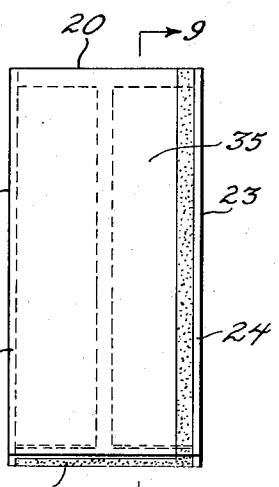
Fig. 8.
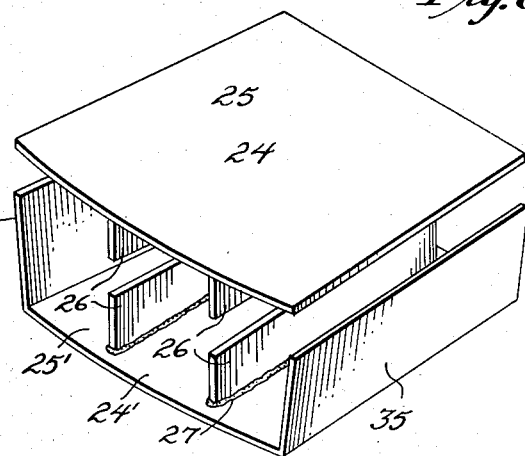
Fig. 11.
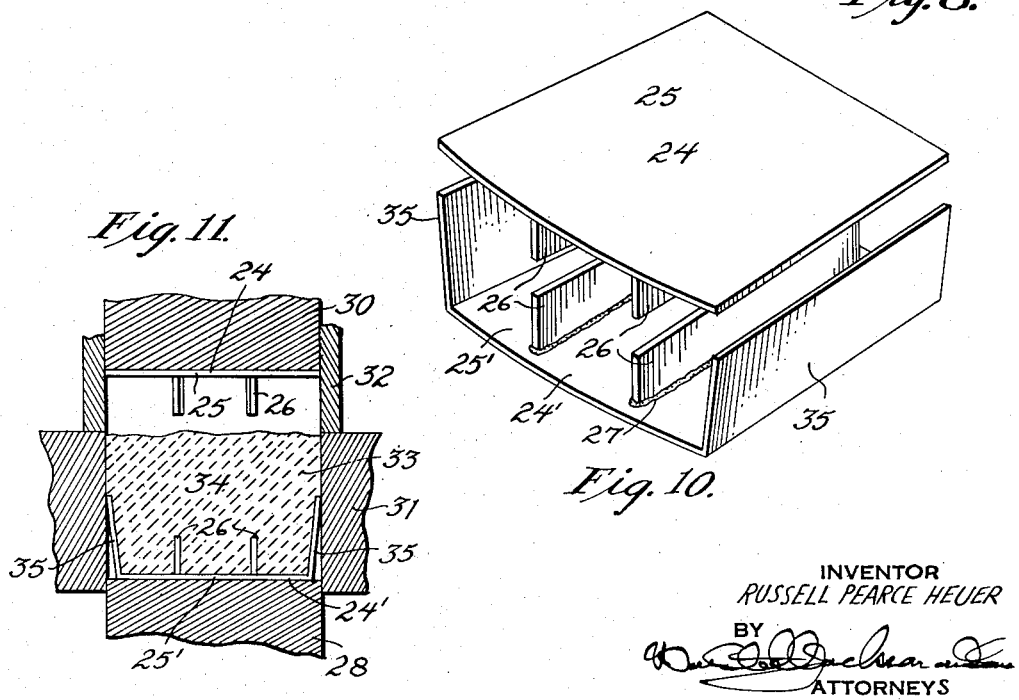
Fig. 10.
INVENTOR
RUSSELL PEARCE HEUER
BY
ATTORNEYS Sept. 8, 1959 — R. P. HEUER — 2,903,254
REFRACTORY LINING FOR ROTARY KILNS
Filed Feb. 16, 1956 — 4 Sheets-Sheet 4

INVENTOR
RUSSELL PEARCE HEUER
BY
ATTORNEYS

United States Patent Office 2,903,254
Patented Sept. 8, 1959

2,903,254

REFRACTORY LINING FOR ROTARY KILNS

Russell Pearce Heuer, Bryn Mawr, Pa., assignor to General Refractories Company, a corporation of Pennsylvania Application February 16, 1956, Serial No. 565,952

7 Claims. (Cl. 263—33)

The present invention relates to refractory linings for rotary kilns used for example in the burning or calcining of dolomite, magnesite, and other compounds of magnesia, Portland cement, other cement containing calcium oxide, lime, and minerals and ores which are compatible with a basic refractory lining.

A purpose of the invention is to improve the service of basic refractories used in rotary kilns by improving the resistance of the basic refractory brick to mechanical failure on account of cracking or spalling transverse to the radius of the kiln.

A further purpose is to line a rotary kiln with a basic refractory brick which is unfired and suitable for use without previous kiln firing, the brick being provided with internal steel plates comolded with the brick and therefore intimately associated with the refractory.

A further purpose is to partition the individual brick by internal plates whose major axes are perpendicular to the hot face of the brick, subdividing the brick laterally into two or more cells and reacting with the refractory to form strengthening columns which reduce the tendency of the brick to crack or spall because of temperature changes.

A further purpose is to provide internal plates which lie radially or perpendicular to the axis of the kiln and facilitate the retention of a coating of kiln charge on the surface of the brick and thus prolong the life of the brick.

A further purpose is to combine the internal plates with external plates extending transverse to the hot face and desirably physically secured directly to the internal plates.

A further purpose is to comold a refractory material such as magnesia or chromite at the end adjoining the hot face and a refractory insulating material at the end adjoining the cold face.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is a front elevation looking at the hot face showing one of the key brick of the invention.

Figure 2 is a radial side elevation of the brick of Figure 1.

Figure 3 is a section on the line 3—3 of Figure 2.

Figure 4 is a perspective showing the opposed external and internal spacer plates used in the brick of Figures 1 to 3, and omitting the refractory material for clarity.

Figure 5 is a central vertical section through the mold in open position showing the molding of a brick according to Figures 1 to 3.

Figure 7 is a front elevation of a modified form of key brick according to the invention looking at the hot face.

The brick of Figure 7 has not only internal plates and external plates on the circumferential sides but also has external plates on the radial sides.

Figure 8 is a side elevation of Figure 7 looking at the circumferential side.

Figure 9 is a section on the line 9—9 of Figure 8.

Figure 10 is a perspective of the spacer plates employed in the brick of Figures 7 to 9, omitting the refractory.

Figure 11 is a diagrammatic central vertical section showing the molding of the refractory brick of Figures 7 to 9, the mold being in open position.

Figure 12:
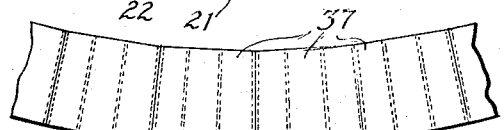

Figure 12 is a digrammatic fragmentary section transverse to the axis and omitting the outer shell, showing a rotary kiln lining employing the refractory brick of Figures 7 to 11 inclusive.

Figure 13:
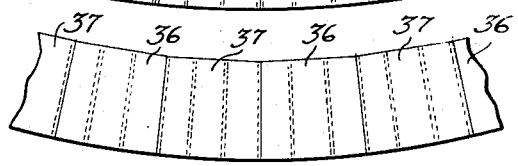

Figure 13 is a diagrammatic fragmentary section transverse to the axis, omitting the outer shell, showing a rotary kiln lining employing the brick of Figures 1 to 5, alternating with the brick of Figures 7 to 11 inclusive.

Figure 14:
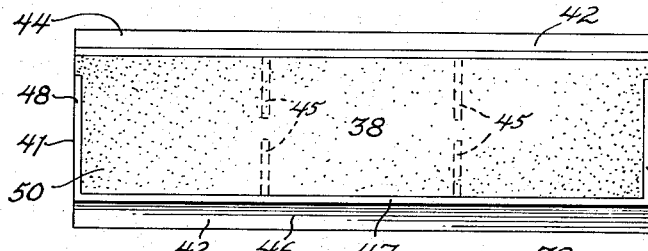

Figure 14 is a front elevation looking at the hot face, showing an arch brick according to the invention, employing external plates on both the circumferential and radial sides as well as internal plates.

Figure 15:
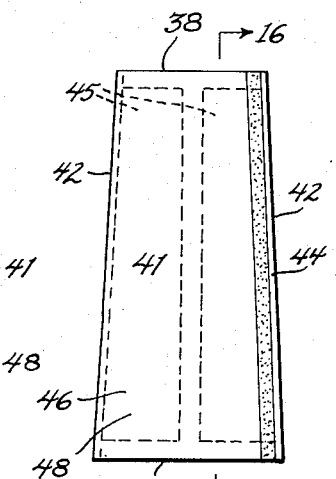

Figure 15 is a side elevation looking at the circumferential side of the arch brick of Figure 14.

Figure 16:
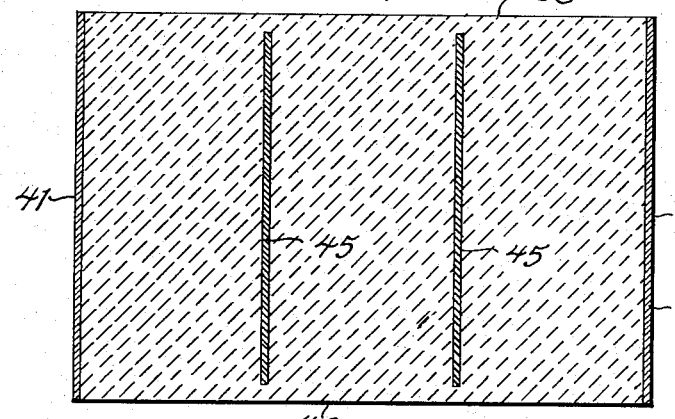

Figure 16 is a section on the line 16—16 of Figure 15.

Figure 17:
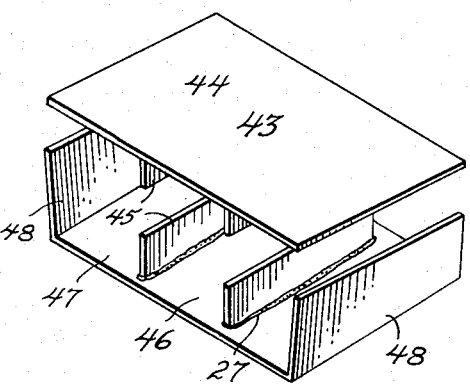

Figure 17 is a perspective showing the spacer plates used in making the brick of Figures 14 to 16.

Figure 18:
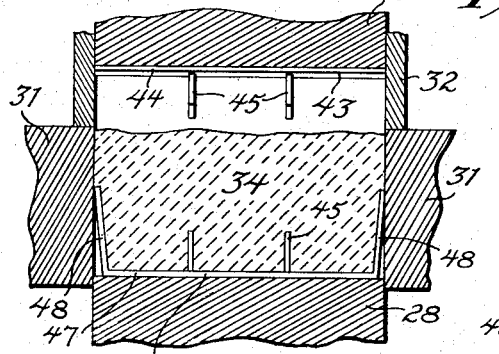

Figure 18 is a diagrammatic central vertical section showing a mold in open position for molding the refractory brick of Figures 14 to 16.

Figure 19:
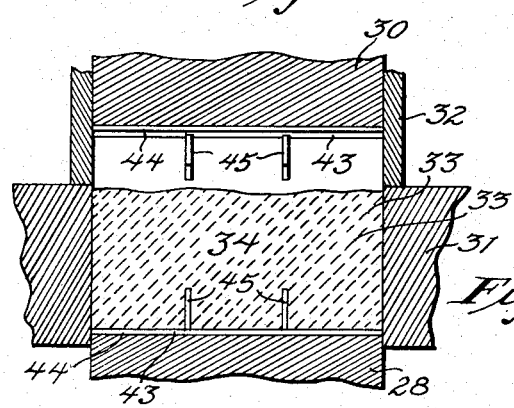

Figure 19 is a view similar to Figure 18 showing an alternate construction of spacer plates for the brick of Figures 14 to 16.

Figure 20:
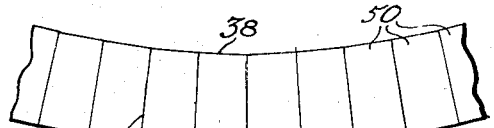

Figure 20 is a diagrammatic fragmentary section transverse to the axis through a rotary kiln lining employing the brick of Figures 14 to 19, and omitting the outer shell.

Figure 21:
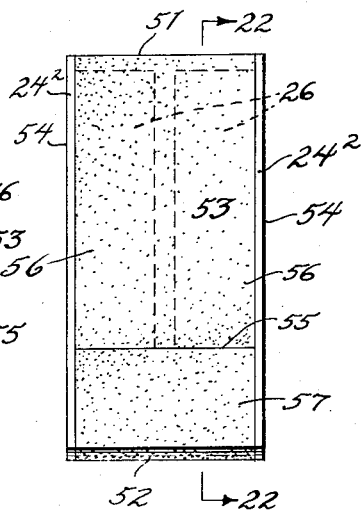

Figure 21 is a radial side elevation of a modified form of brick according to the invention, employing basic refractory at the hot end and refractory insulation in comolded relation at the cold end.

Figure 22:
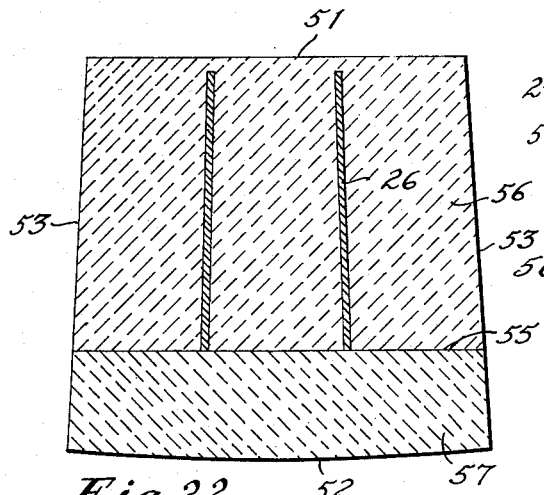

Figure 22 is a section on the line 22—22 of Figure 21.

Figure 23:
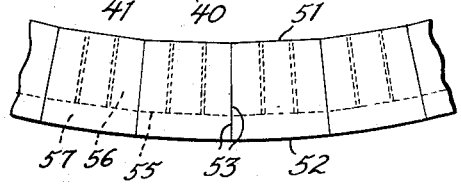

Figure 23 is a diagrammatic fragmentary section transverse to the axis showing a rotary kiln lining using the refractory brick of Figures 21 and 22 and omitting the outer shell.

Rotary kilns of the character of rotary cement kilns are lined with refractory brick which protect the shell from the heat in the kiln. When the kiln operates at low temperatures, fire clay or high alumina brick are suitable, but for highest temperatures and where the charge is high in lime or magnesia, basic brick containing more than 30 percent magnesia are used to minimize the chemical attack of the charge on the kiln lining and obtain greater refractoriness. Such brick are usually made from refractory magnesia such as periclase or dead burned magnesite, and they may consist substantially entirely of such materials. On the other hand, chromite may be incorporated provided there is at least 30 percent of magnesia by weight so that the primary ingredients will ordinarily be magnesia or a mixture of magnesia and chromite. In addition olivine or other siliceous materials may be added up to a maximum of about 35 percent of silica in the refractory.

The brick will also ordinarily having a bonding substance present to the extent of 1 to 10 percent by weight of the dry refractory mixture. Such bonding substances will ordinarily be magnesium chloride, magnesium sulfate, chromic acid, sulfuric acid, kaolin, metallic iron or the like. The bonded brick are unfired and used unfired, the heat in the kiln developing a ceramic bond.

Such unfired brick usually exhibit a lower thermal conductivity than fired brick and cause less heat conduction through the lining.

In a rotary kiln it is important that the lining fit properly against the metallic shell of the kiln. If the refractory lining is to loosen, or if the refractory brick shrink when heated to firing temperature during use, the lining will be damaged when the kiln is rotated because the weight of the refractory brick and of the charge will not be properly carried by the shell as the kiln turns. On the other hand, it is very objectionable to fit the brick too tightly to the shell, as the increase in size of the brick which occurs during heating may cause the development of excessive compressive forces on the brick which will cause cracking.

Great advantage has developed from the use of iron or steel spacer plates, usually about 1/16 inch thick, in the radial joints between basic refractory brick in a rotary kiln lining. These plates oxidize at the hot face forming iron oxide which may combine with the magnesia present in the brick to form magnesioferrite. When the plates are at the joints oxidation is commonly accompanied by an increase in volume of the plates. This increase in volume is helpful in keeping the lining tight but unfortunately the action is not uniform throughout the thickness of the lining because oxidation takes place at the hot face and the subsequent reaction is most intensive at the hot face, whereas reaction at the cold face is negligible.

I have discovered that the service characteristics of basic refractory linings for rotary kilns can be greatly improved by extending comolded internal plates through the brick transverse to the hot face.

The internal plates employed in the present invention exhibit a substantially different behavior from the external plates. Whereas in the external plates the functioning is almost entirely concerned with the strengthening of the lining by bonding together one brick with its neighbor, the internal plates greatly change the functioning of the internal structure of the brick by subdividing the brick into cells and then strengthening the cells by forming magnesioferrite at their partition walls.

Unlike the magnesioferrite which commonly forms from the external plates, the magnesioferrite forming by reaction with the comolded refractory on the interior of the brick is produced without appreciable increase in volume, and therefore does not disrupt the brick structure.

It is important in the present invention to use bonded basic refractory brick prepared without previous kiln firing, since of course the steel plates would not remain through a refractory brick kiln operation.

The internal plates should always be in a position perpendicular to the axis or radial of the rotary kiln lining as far as possible.

In making up the brick according to the present invention, I preferably use refractory magnesia such as periclase or dead burned magnesite which preferably contains more than 85 percent of magnesia. The following are typical analyses of suitable magnesias by weight:

|  | Sea Water Periclase | Dead Burned Magnesite |
| --- | --- | --- |
| Ignition Loss | 0.06 | 0.69 |
| $SiO_2$ | 4.58 | 0.79 |
| $Fe_2O_3$ | 0.64 | 6.35 |
| $Al_2O_3$ | 1.05 | 0.55 |
| CaO | 1.27 | 2.44 |
| MgO (by diff.) | 92.40 | 89.18 |

The magnesia may where desired be mixed with up to 70 percent of chromite by weight. The chromite may for example be Cuban, Philippine, Grecian, Rhodesian or Transvaal chromite, as desired.

It is preferable to use mixtures of course and fine grains, a suitable example of a desirable grain size mixture for rotary kiln brick being as follows:

The brick are desirably bonded with sulfuric acid, for example 1 percent by weight, and kaolin, suitably 1 to 3 percent by weight. Iron powder may be added where desired to the extent of 5 percent by weight.

The brick shown in Figures 1 to 5 inclusive is a key brick having a hot end 20, a cold end 21, radial sides 22 and circumferential sides 23, as well known in the art.

As shown, the hot end may conveniently be straight but the cold end is desirably curved to fit the interior of the metallic shell of the kiln.

Opposed steel plate assemblies 24 are used, as best seen in Figure 4.

The spacer plates here shown and those described elsewhere herein are desirably formed of iron or steel sheet or plate, which may be plain carbon steel or alloy steel including stainless steel if desired. The plate thickness is usually about 1/16 inch, although plate thickness may as desired be used in the range from about 1/64 inch or thinner to about 3/8 inch or thicker.

The plate assemblies desirably consist of an external plate 25 which is preferably formed to fit the entire circumferential side of the brick and internal plates 26 transverse to the external plate which are preferably united as by welding at 27 to the external plates. While it will be recognized that a single internal plate can be used extending radially, it is preferable to use two radial internal plates as shown, each consisting of halves or portions extending from the opposite sides almost to the center. It will be evident that the question of whether the internal plates extend from opposite sides toward the center or extend entirely from one side is immaterial except in the technique of molding.

The plates should in any case extend at least 80 percent of the length of the refractory portion of the brick, although they preferably will not be carried through the heat insulation portion if any at the cold end.

In molding the brick, a mold is used as shown in Figure 5 consisting of a lower die 28 and an upper die 30 movable toward one another, preferably by moving the upper die downward. The mold has sides 31 and side extensions 32 which define an interior space 33 in which the brick is to be formed.

One of the plate assemblies 24 is placed on the bottom die with the external plate 25 resting thereon and the internal plate halves 26 extending upwardly. A basic refractory mixture 34 is placed in the mold on the plate assembly 24 and another plate assembly 24 is placed on the top of the refractory either by hand or preferably is secured to the upper die by a magnetic chuck or other means as well known. The upper plate assembly has the external plate 25 extending across the bottom of the upper die and the interior plate halves 26 extending downwardly, parallel to and in line with the plate halves on the lower plate assembly.

When the mold halves move together under a suitable forming pressure, a brick is produced as shown in Figures 1 to 3 with the interior plates and exterior plates united to the refractory by comolding.

The pressure applied in molding will in any case exceed 1000 p.s.i., preferably exceeding 5000 p.s.i., and most desirably being at least 7000 p.s.i. or more.

The molded brick are desirably cured in carbon dioxide gas, as well known in the art, and dried and placed in service.

In the form of brick shown in Figures 1 to 3 inclusive, no external plates are provided at the radial sides 22.

The form of Figures 7 to 11 inclusive uses one plate assembly 24 along with a plate assembly 24' which has in addition to the external plate portion 25' extending along the circumferential side, U-shaped arms 35 which initially extend out from the plate portion 25' at an angle greater than a right angle, but which under the molding pressure are forced out square, as shown in Figure 7 and cover substantially all of the radial side.

The molding technique is carried out as already described except that the plate assembly 24' is placed in the bottom of the mold before the refractory is added. The external plate portion 25' prior to the molding operation is desirably not quite wide enough to extend across the mold, but the arms 35 engage the mold sides, and, as previously explained, are forced out to occupy the full width when molding is finished.

Figure 6:
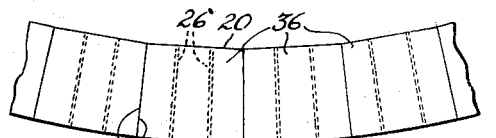
Figure 6 is a diagrammatic fragmentary section transverse to the axis and omitting the outer shell, showing a rotary kiln lining employing the brick of Figures 1 to 5.

In many cases the user will prefer to form a kiln lining using the brick of Figures 1 to 3 without external plates in the radial joints. The lining will be as shown in Figure 6. The internal plates when heated in service will oxidize, but the iron oxide formed near the hot end will produce magnesioferrite and diffuse into the adjoining refractory without appreciable increase in volume. In this manner the objectionable features of differential contraction and expansion which attend the use of external plates in the radial joints will be avoided. The radial internal plates tend to reduce spalling and cracking, and facilitate the retention of a coating of the kiln charge on the hot face of the brick which gives a longer life to the brick, but they do not cause erratic overall expansion.

Where external plates in radial joints are desired, the user has the option of employing loose plates in the radial joints, or of using the brick 37 of Figures 7 to 9, as shown in Figure 12.

Where the user desires to avoid the double exterior plates at the radial joints, he may use brick 36 according to Figures 1 to 3 alternating with brick 37 of Figures 7 to 9, as in Figure 12.

The construction of Figures 1 to 13 inclusive uses key brick, which are more mechanically stable than the arch brick now conventionally used in rotary kiln linings. If, however, the user prefers arch brick, it is advantageous to use internal plates running transverse to the hot face in such arch brick.

Figures 14 to 16 show such an arch brick having a hot face 38, a cold face 40, and circumferential sides 41 and radial sides 42.

In molding the brick an upper metallic plate assembly 43 is used having a flat external plate 44 which substantially covers the radial side and having welded thereon and extending transverse to the axis radial internal wedge plate halves 45, of which two are shown equally spaced. An opposed plate assembly 46 is provided which has an external plate portion 47 which as initially formed covers almost the entire lower radial side, but is slightly narrower than the mold of Figure 18, as shown. The plate portion 47 is joined to U-shaped arms 48 of wedge shape and join the plate portion 47 at an angle initially greater than a right angle, sealing to the mold sides.

The internal plate portions 45 from the opposite plate assemblies are in line and in the molded brick extend almost to the center.

In molding as shown in Figure 18 the plate assembly 46 is first placed on the bottom die with the plate portions 45 and 48 upstanding and the plate arm portions 48 sealing against the sides 31 of the mold. Basic refractory mixture 34 is then inserted in the mold and the plate assembly 43 is placed on top with the plate portions 45 sticking down as already described.

In the molded brick the arms 48 are forced out in right angle relation to the portion 47 as seen in Figure 14.

If plates should not be desired on the circumferential sides 41, the structure can be molded as shown in Figure 19 by using two plate assemblies 43 as shown.

The arch brick when placed in the lining form a rotary kiln lining as illustrated in Figure 20 where the brick are positioned at 50.

In some cases it is desirable to have the rotary kiln brick provided with insulation material in comolded relation to the refractory material and located at the cold end. This is illustrated in Figures 21, 22 and 23. This brick has a hot end 51, a cold end 52, radial sides 53 and circumferential sides 54.

Whereas the brick is shown as being a key brick, it may also be made of arch form. It is a matter of selection among the possibilities presented by the invention as to whether the external plates are provided on the radial faces or not.

In the form shown, the basic refractory 56 extends from the hot end to the comolded joint 55 and has plate assemblies 24² which go as far toward the cold end as the joint 55 and otherwise are generally similar to those shown in Figure 4. At the cold end the heat insulation material 57 is provided.

In the technique of molding, a partition may be inserted in the mold in the plane of the paper of Figure 5, at the position of the joint 55, and refractory material inserted on one side of the partition and heat insulation material on the other side and then the partition carefully withdrawn, after which the molding proceeds as usual.

The insulating material may be calcined fire clay or calcined kaolin which is bonded with a suitable bond such as about 10 percent of calcined magnesia plus about 1 percent of magnesium chloride or magnesium sulfate.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. A refractory lining for a rotary kiln having a longitudinal axis, said lining being adapted to extend circumferentially around said longitudinal axis of the kiln thus to hold a charge and comprising a plurality of basic refractory brick each having a refractory body containing more than about 30% magnesium oxide and said brick being unfired and suitable for use in the unfired condition, said brick having side faces in the lining and being disposed side by side at said faces, and each said brick having a small end which constitutes the hot end and having a larger opposite end, the refractory in each said brick being comolded with an internal steel plate subdividing said body into cells, the plate having opposite side surfaces lying between said cells and between opposite side faces of the corresponding brick in the lining and having an end surface directed inward toward the axis of the kiln, and each said brick including a steel spacer plate on a side face thereof in the lining, said steel spacer plate separating the refractory in the corresponding brick from the adjacent brick, and said plates in operation of the kiln being susceptible to oxidation at the hot ends of the brick thus producing bonds between the refractory bodies of the brick at said spacer plates and spall-resistant and corrosion-resistant columns of magnesioferrite inside the refractory bodies of the brick in the vicinity of said internal plates.

2. A refractory lining in accordance with claim 1, in which there are a plurality of comolded internal steel plates spaced from each other in the interior of the refractory body of each individual brick subdividing said body into cells, said plates having opposite side surfaces lying between said cells and between opposite side faces of the corresponding brick in the lining and having end surfaces directed inward toward the axis of the kiln.

3. A refractory lining in accordance with claim 1, in which the brick are key-shaped and said opposite surfaces of the internal plates extend longitudinally of the kiln.

4. A refractory lining in accordance with claim 1, in which the brick are arch shaped and said opposite surfaces of the internal plates lie in plane perpendicular to the axis of the kiln.

5. A refractory lining in accordance with claim 1, in which said side faces of the brick in the lining extend circumferentially and longitudinally of the lining and the refractory of the brick is separated by steel spacer plates between the longitudinally and circumferentially extending side faces, the spacer plates between the longitudinally extending side faces of the brick being comolded with the refractory material of individual brick in the lining and directly contacting the refractory material of corresponding longitudinally extending side faces of adjacent individual brick in the lining.

6. A refractory lining in accordance with claim 1, in which the brick are integral composites, each brick having in unfired condition at the hot end a refractory material containing more than about 30% magnesium oxide and having refractory insulation at the cold end united to the refractory material by comolding.

7. A refractory lining for a rotary kiln having a longitudinal axis, said lining being adapted to extend circumferentially around said longitudinal axis of the kiln thus to hold a charge and comprising a plurality of basic refractory brick each having a refractory body containing more than about 30% magnesium oxide and said brick being unfired and suitable for use in the unfired condition, said brick having side faces in the lining and being disposed side by side at said faces, and each said brick having a small end which constitutes the hot end and having a larger opposite end, the refractory in each said brick being comolded with an internal steel plate subdividing said body into cells, the plate having opposite side surfaces lying between said cells and between opposite side faces of the corresponding brick in the lining and having an end surface directed inward toward the axis of the kiln, and each said brick including a steel spacer plate on a side face thereof in the lining, said steel spacer plate separating the refractory in the corresponding brick from the adjacent brick and being integral with said internal steel plate, and said plates in operation of the kiln being susceptible to oxidation at the hot ends of the brick thus producing bonds between the refractory bodies of the brick at said spacer plates and spall-resistant and corrosion-resistant columns of magnesioferrite inside the refractory bodies of the brick in the vicinity of said internal plates.

References Cited in the file of this patent

UNITED STATES PATENTS

| | | |
|---|---|---|
| 1,378,710 | Meyerhofer | May 17, 1921 |
| 1,823,356 | Frink | Sept. 15, 1931 |
| 2,230,142 | Longacre | Jan. 28, 1941 |
| 2,652,793 | Heuer et al. | Sept. 22, 1953 |

FOREIGN PATENTS

| | | |
|---|---|---|
| 696,311 | Great Britain | Aug. 26, 1953 |

OTHER REFERENCES

Pages 387 and 388 of Modern Furnace Technology by Etherington, 1938, published in London by Charles Griffin & Co., Ltd.